United States Patent [19]

Claffie

[11] 3,853,321

[45] Dec. 10, 1974

[54] LETTER-NAME PERCEPTION AND DISCRIMINATION GAME APPARATUS

[76] Inventor: Bruce A. Claffie, 8 Hemlock Dr., Miller Place, N.Y. 11764

[22] Filed: Mar. 29, 1974

[21] Appl. No.: 456,228

[52] U.S. Cl............. 273/130 A, 35/22 A, 35/35 H, 273/1 M
[51] Int. Cl. .............................................. A63f 3/00
[58] Field of Search ... 273/1 R, 1 M, 130 R, 130 A, 273/130 E, 136 E, 137 AE, 140; 35/22 A, 31 F, 31 D, 31 G, 35 H, 35 J, 69, 70, 71, 72, 73

[56] References Cited
UNITED STATES PATENTS

| 611,545 | 9/1898 | Yarnall............................ 273/1 M |
| 947,124 | 1/1910 | Renner............................ 273/140 X |
| 1,509,873 | 9/1924 | Ordway............................ 273/1 M |
| 2,496,096 | 1/1950 | Kelley............................. 273/140 |
| 2,723,465 | 11/1955 | Silverstein........................ 35/22 A X |
| 3,612,536 | 10/1971 | Saul .............................. 273/153 R |
| 3,627,316 | 12/1971 | Machinski......................... 273/1 M |
| 3,628,792 | 12/1971 | Frederick, et al. ............... 273/140 X |
| 3,724,848 | 4/1973 | Glass, et al....................... 273/1 R |

FOREIGN PATENTS OR APPLICATIONS

| 443,726 | 5/1927 | Germany ........................ 273/130 A |
| 603,207 | 6/1948 | Great Britain.................... 35/73 |
| 1,089,613 | 11/1967 | Great Britain.................... 35/22 A |

Primary Examiner—Richard C. Pinkham
Assistant Examiner—Harry G. Strappello
Attorney, Agent, or Firm—Anthony J. Casella

[57] ABSTRACT

A game to facilitate the learning of the alphabet includes the combination of a game board having a plurality of cut-outs corresponding in configuration to letters of the alphabet, a plurality of metallic letter pieces adapted to be fitting within the cut-outs of the game board, a magnetic pick-up device, and a grid structure on which the letter pieces are initially placed. Utilizing the pick-up device, the player attempts to engage a letter piece and pass it through the grid structure, and having successfully completed that operation, the player then positions the letter piece in the appropriate cut-out in the game board. The steps of manipulating the letter piece through the grid structure and subsequently fitting the letter piece in the appropriate cut-out provides the player, especially a child, with desired exercises to facilitate learning and recognition of letters.

12 Claims, 11 Drawing Figures

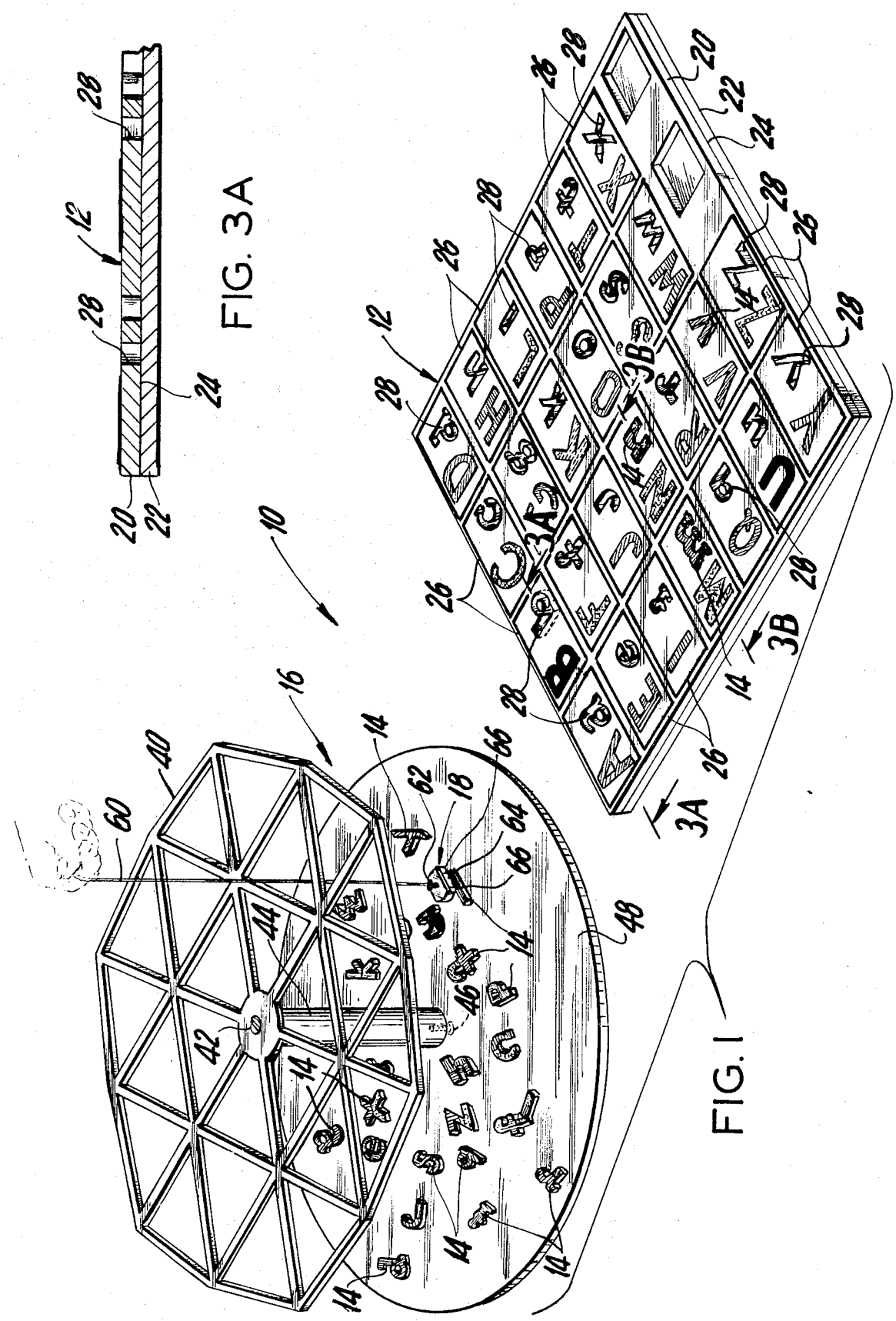

LETTER-NAME PERCEPTION AND DISCRIMINATION GAME APPARATUS

The subject invention relates to a letter or name perception and discrimination game which is especially adapted for facilitating the learning of the alphabet by children.

There have been numerous studies done which have attempted to determine why many children encounter great difficulty in learning how to read. Such children typically stumble from word to word, omit or substitute words, invert and even reverse the word before them. In attempting to determine the cause for this learning disability, it appears that such children possess some deficiency in the discrimination of detail and of spatial orientation of the letters of the alphabet, and the words that such letters make up. The children seem unable to distinguish what are the important features of the printed forms, their characteristic relationships, and spatial position in the word. Subsequently, their ability to memorize the shapes and names of the letters may be impeded.

It follows then that the more similar in form various letters are, the more they are confused and interchanged with one another by the learning disabled reader. Thus "b," "d," "p" and "q" are the letters most frequently reversed. The letters "b," "p," "d" and "q," "n" and "u" often fall victim to inversion. When these tendencies persist after the ages of 7 and 8, remedial and corrective action must be taken. Here again the point is made that the reading disability is due to the inability of many children to benefit from the particular details in letter shapes that make most letters distinctive, their position and angle in the word, and their relationship to one another within the word context. These are symptoms that may be related to many possible causes, but the attempt to pinpoint a specific organic perceptual impairment as its cause has not succeeded.

While the search goes on, many educational researchers have contended themselves with investigating a number of possible causal-effect relationships that tend to determine how quickly the child will learn to read. Such reading readiness skills as ability to follow direction, ability to discriminate similarities and differences in sound, sense of sequence, and ability to interpret pictures, to name a few, are factors typically studied to see if ability in one or more is a prerequisite to success in learning how to read.

Numerous studies, both past and present, contain a number of suggestions for the classroom teacher as to the kind of ground work or preparation instruction the child should receive prior to learning how to read.

It is generally recommended that the teacher emphasize visual discrimination tasks which would include reading letters and numbers, word matching, and pattern copying. Using words and letters is stressed because the studies suggest that matching animal pictures, geometric forms, or any kind of non-verbal graphic stimuli does not appear to transfer to word discrimination. Besides, matching letters is an easy task for kindergarden children, thus the earliest visual discrimination exercises should use letter stimuli. It follows that the sooner the kindergarden or first grade teacher can observe the ability of his or her pupil to perform such visual discrimination tasks, the sooner they will be able to determine the child's readiness to read with respect to visual discrimination.

It is with this background knowledge of the importance of basing reading readiness instruction on the use of letters and numbers that the subject invention was conceived.

In general, the subject game apparatus for improving the letter-learning perception and discrimination capabilities of a child comprises the combination of a game board having a plurality of cut-outs corresponding in configuration to letters of the alphabet, as well as other indicia thereon, along with a plurality of letter pieces that are adapted to be fitted within the cut-outs in the game board. In addition a grid structure is provided having a platform portion on which the letter pieces are placed, and spaced from said platform is a grid having a plurality of openings corresponding in size to the largest of the letter pieces. Each of the letters is made, at least in part, of a magnetically metallic material, and the apparatus further includes a magnetic pick-up device. In the playing of the game, the letter pieces are placed on the platform, and the child manually manipulates the magnetic pick-up device through an opening in the grid in order to engage one of the letter pieces. A child must then, carefully, lift the letter piece utilizing the magnetic pick-up device through the grid, without causing the letter piece to strike the grid and fall back onto the platform. Once the letter piece has cleared the grid structure, the child then removes the letter piece from the magnetic pick-up device, and places the letter piece into the corresponding cut-out in the game board. The cut-outs in the game board are the lower case of the alphabet, and adjacent each cut-out is the corresponding capital letter of the lower case letter. By using his sense of touch, the visual impression of the colored letter pieces, and by manipulating the pieces through the grid structure and into the corresponding cut-out in the game board, the child is afforded the physical and mental impressions desired for facilitating the learning of the alphabet.

Further objects and advantages of the subject invention will become apparent from a reading of the following detailed description taken in conjunction with the drawings in which:

FIG. 1 is a perspective view of the game apparatus of the subject invention;

FIG. 3A is a sectional view taken along line 3A—3A in FIG. 1;

Figure 3B:
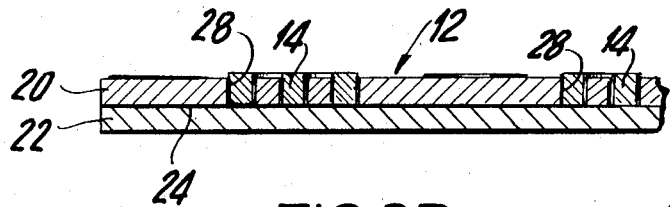
FIG. 3B is a sectional view taken along line 3B—3B in FIG. 1.

Referring to FIG. 1 there is illustrated the letter-name perception and discrimination game, generally designated by the numeral 10, which basically includes a game board 12, a plurality of letter pieces 14, grid structure means 16, and a magnetic pick-up device 18. The game board 12 is generally rectangular in configuration and is preferably made of multi-layer construction including upper layer 20 and lower layer 22 which are adhered along their common surface designated by numeral 24. The upper layer 20 is provided with indicia, and is subdivided into 26 areas by painted division or border lines 26, with each area being for one of the letters of the alphabet. Within each border line 26 there is the capital letter of the alphabet, and a corresponding cut-out 28 in the configuration of the lower case equivalent of such letter. Preferably the border 26 is painted black so as to clearly separate adjacent letters, and each letter within the border is painted with a different color so as to provide contrast between adjacent letters. For example, the letter "a" on the game board 12 may be in green, whereas its adjacent letter "b" is black, while "e" is pink, and "f" is orange. As shown in FIG. 1, each of the letters is assigned a color, with the colors being indicated thereon according to the chart for draftsmen in the Patent Office Rules of Practice. It is noted that the color of each capital letter is equivalent to its associated lower case letter, thereby affording the player a visual impression of the relationship between the associated lower and upper case letters. As illustrated in FIG. 3A, the cut-outs 28 of the lower case letters preferably extend through the upper layer 20 to the glue line 24. FIG. 3B illustrates a section through a cut-out 28 in which a letter piece 14 is placed, and it is noted that the size and configuration of the cut-out closely correspond to the size and configuration of the letter piece 14. In addition, it may be noted that the upper and lower case letters provided on the game board 12 should preferably be of the design found in primary school reading books, and the size of the corresponding upper and lower case letters must be in proper proportions. The emphasis on the game is for the player, such as a child, to learn the lower case letters since it is found that lower case letters cause the greatest difficulty of recognition for a young child, to such an extent that the primary emphasis of the subject game is on learning the lower case letters. In addition, story books and school readers nationally emphasize lower case letters, and it also has been found that capital letters seem to cause the least difficulties in perception identification of letters by the child. The necessity for contrasting colors of the letters on the game board is to make it easier for the child to identify the different letters on the game board 12.

Figures 2A, 2B, 2C, 2D, 2E:
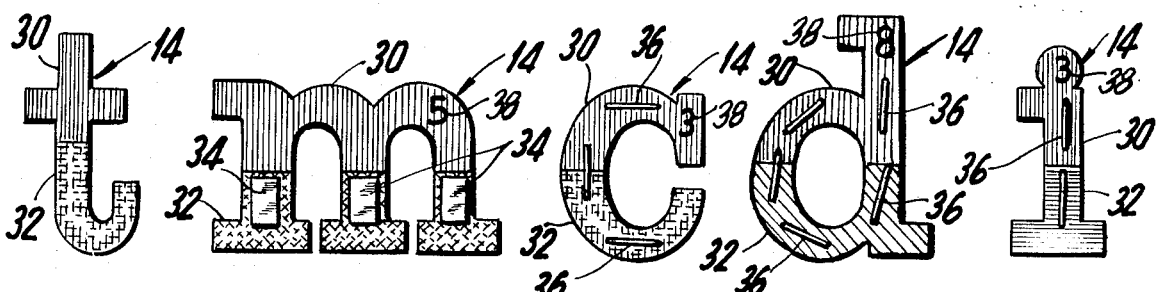
FIGS. 2A–2E are plan views of several letter pieces made according to the subject invention.

Preferably, two game boards are provided in order to enable two children to play the subject game in a competitive manner. Likewise, two complete sets of letter pieces 14 are provided, with each of the letter pieces being painted with the top half 30 of each letter piece being painted in a vivid color (such as red), while the lower half 32 is painted in a relatively muted color. The reason for this is that it has been found that subconsciously the individual player recognizes letters primarily by the top portion of the letter. For instance, if the top half of a lower case letter were covered and shown to a player, it would be very difficult for a player to recognize the letter. On the other hand, if the lower half of the letter piece was covered, it would be relatively easy for the player to recognize the letter. Thus, it is desirable that the upper half 30 of each letter be painted a vivid color, such as red as indicated in FIGS. 2A–2E, in order to subconsciously focus the player's eyes on to the top portion 30 of the letter piece for better cues as to identification and perception, as well as discrimination of that letter. Referring to the "t" letter piece in FIG. 2A, the letter piece is preferably made of a magnetically metallic material so as to be capable of being picked-up by the magnetic pick-up device 18. Alternate arrangements for enabling the letter pieces to be picked up are illustrated in FIGS. 2B through FIG. 2E. In FIG. 2B, the "m" letter piece includes magnetically metallic elements 34 imbedded in the letter piece, whereas the letter pieces illustrated in FIGS. 2C, 2D and 2E may include magnetically metallic staples 36 imbedded into the non-metallic letter pieces. The use of a magnetic pick-up device 18 in conjunction with the letter pieces, being at least partially of metallic construction, provides an arrangement wherein the child must exercise a certain degree of skill and dexterity in manipulating the letter pieces through the grid structure means 16, as more fully described hereinafter.

Referring again to FIG. 1, the grid structure means comprises a grid 40 which may be made so as to include a plurality of triangular openings that are of equal size, and greater than the largest of the letter pieces 14. The grid 40 is connected by a screw 42 to a center post 44, with the opposite end of the center post 44 being connected by a second screw 46 to a platform 48. The diameter of the platform is slightly larger than the overall size of the grid 40, and preferably the platform is painted white in order to provide a contrasting background to the painted letter pieces 14. In general, the size of the individual triangular openings of the grid 40 is dictated by the size of the largest letter piece 14. Generally, the largest letter piece 14 is an "m" "y" or "w," and the grid 40 should be made so that the largest letter piece is capable of being passed through a triangular opening with a minimum of clearance in order to make the game more challenging to the player. Preferably, the openings or triangles in the grid 40 should be of the same size because it is not desirable for the player to lift a letter piece 14 through an opening which is smaller than the letter because, of course, it would drop back onto the platform 48 thereby causing the youngster to become very frustrated, and quickly losing interest in playing the game.

Figure 5:
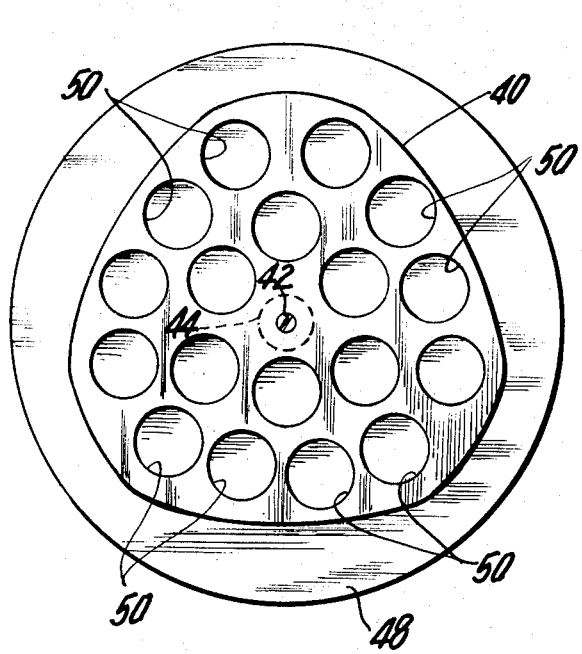
FIG. 5 is a plan view of an alternate embodiment of the grid structure of the subject apparatus.
Figure 6:
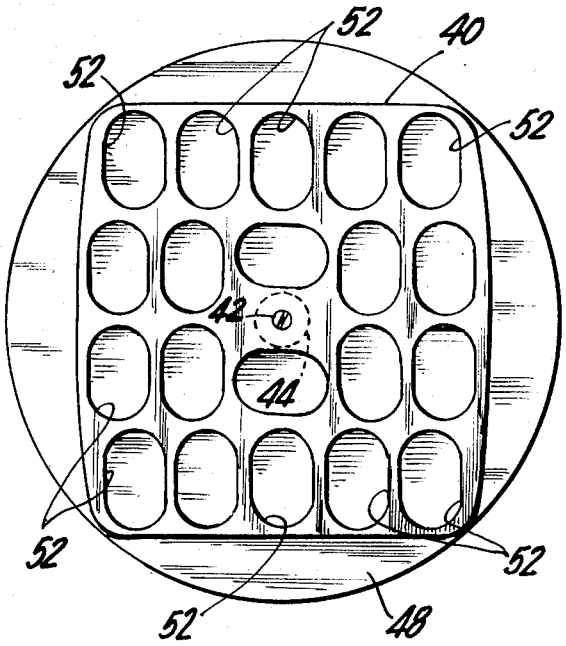
FIG. 6 is a second alternate embodiment of the grid structure of the subject apparatus.

FIG. 5 illustrates an alternate embodiment of the grid structure means, wherein the grid 40 includes a plurality of circular openings 50, while in the embodiment illustrated in FIG. 6, the grid includes a plurality of oblong openings 52. Alternatively, the openings may be rectangular, or any other configuration capable of passing the letter pieces 14.

Figure 4:
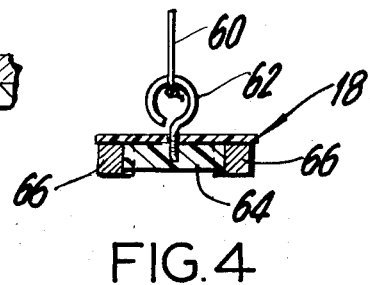
FIG. 4 is a side sectional view of the magnetic pick-up device of the subject invention.

Referring now to FIGS. 1 and 4, the magnetic pick-up device 18 includes a string or chain 60 which is attached to a hook member 62 that is secured, in turn, to a plastic support member 64. Glued to the plastic member 64 are a pair of curved magnets 66, 66. It is particularly desirable that as much as possible of the magnetic pick-up device be transparent so that the player can see as much as possible of the letter piece 14 that he is attempting to lift through the grid 40. In general, the game is a competitive game and is very intense. Thus, during the playing of the game while a player is attempting to a pass a letter piece through the triangular opening of the grid 40, the player is concentrating on the letter piece as he lifts the letter piece through the opening, and he is very conscious of the fact that if he jerks the letter piece too quickly, the letter piece may fall, and thus he would loose his turn. While he is focusing his eyes on the letter piece being lifted, it is particularly desirable that he see as much as the letter piece as possible because this will greatly aid in his recognition of the letter. Along these lines, it is noted that by providing only the lower half of each letter piece 14 with metallic portions, as shown in FIG. 2B, while the child is lifting the letter piece through the grid, the upper half 30 of the letter piece will be clearly visible, thereby providing the child with an important cue for recognition and identification of the letter.

As mentioned above, the game may be competitively played, in which case two game boards 12 are provided, as well as two complete sets of lower case letter pieces 14. The object of the game is to complete the alphabet before the opponent does, and this is accomplished by a player picking up each letter piece using the magnetic pick-up device 18, lifting each letter piece through the grid 40, and placing the letter piece in its proper cutout 28. If a player pulls up the magnetic pick-up device 18 too fast, or bumps the device 18 or letter piece on the grid 40, the letter piece will fall back onto the platform 48, and it is then the turn of the opposition player.

Following are four rules which are suggested for competitive playing of the subject game apparatus by children.

1. The player is to tell his opponent what letter he intends to pick-up by saying, "I am going to pick up the letter c, e, u, etc."

2. When the letter piece has been maneuvered by the player through the grid 40 using the magnetic pick-up device 18, the player pulls the letter piece away from the pick-up device.

3. The letter piece 14 is then to be placed in the corresponding letter cut-out in the player's game board, and the player is to say "I am going to place the letter "c," "e," "u" etc., in my game board."

4. Each player must follow the rules exactly, or else lose his turn. For example, improperly naming a letter or placing it in the wrong cut-out will require the player to put the letter piece back onto the platform 48, and relinquish the turn to the opponent.

The rational of these rules is to achieve several objectives. First, it is to be noted that since only the upper halves of the letter pieces are painted red, the player's attention is drawn, either subconsciously or consciously, to the upper portion of each letter. This is desirable since researchers have found this to be especially important in correct discrimination of letters by children. Next, the rules are designed to bring into play as many senses as possible. The child player is requested to verbally state the name of the letter he is attempting to pick up, and presumptively, he is visually concentrating on that letter when he pulls it upwardly and through the grid 40. Thirdly, the player is getting tactile and kinesthetic reinforcement as he holds each letter piece in his hand, and lastly his learning is further enhanced by repeating the name of the letter as he correctly matches it with the painted outline in the appropriate cut-out in the game board. Since lower case letters are more difficult to recognize and discriminate than upper case letters, the child is aided in his recognition of lower case letters by having the form of the upper case letter close at hand, more particularly, as painted on the game board 12. Learning about upper and lower case letters thus becomes easier for the child.

A variation of the game utilizing the game apparatus of the subject invention may be accomplished by assigning numeral values to the letter pieces. Referring in particular to FIGS. 2B through 2E, it is noted that the letters "c" and "i" includes a numeral incidia 38 of a value of three, while referring to FIG. 2B, the letter "m" is assigned a numeral value of five. The letter "d" (See FIG. 2D) is assigned a value of eight. Utilizing the combination of the lower case letters and the numerals assigned to each letter, a variation of the subject game is obtained. The second game aims toward prevention or remediation of two problems common to young readers, these being the inversion and reversal of letters that are similar in form. Reversals cause more problems than inversions. Particularly the letters "b," "d," "p," and "q." Letters that typically cause inversion difficulties are "b," "p," "d," "q," "n," "u," "m" and "w." In the second game only one alphabet set of letter pieces 14 is used. Each letter of the alphabet is given a numeral worth of one to eight points, with a total worth of all of the letters of the alphabet being 100. The object of the game is to obtain enough letters to reach a score of 51 or more points to win the game.

The following letters are assigned a numeral value of one: x, y, and z.

The following letters are assigned a numeral value of three: a, c, e, f, g, h, i, j, k, l, o, r, s, t, and v. The following letters are assigned a numeral value of five: m, n, and w. The following letters are assigned a numeral value of eight: b, d, p, and q.

It is to be observed that the letters previously mentioned, or particularly the ones that are often reversed, count the most. Since these are highest in value, it is believed that these will be the letters most frequently sought, which is the whole idea behind the second variation of the game, since its main purpose is to deal with the reversal and inversion problems. For this game, the same rules as for the first game mentioned above apply in reference to stating the name of the letter, picking up the letter utilizing the pick-up device 18, and passing the letter piece through the grid, naming the letter and placing it in the appropriate cut-out in the game board.

The joy of winning provides motivation for both games. The child will follow the rules and learn during the process. It is believed that utilizing the game apparatus of the subject invention, in conjunction with conventional methods of teaching letter names, perception, and discrimination, will do much in providing the child with the important readiness skills for reading. In addition, the subject apparatus can be used as a diagnostic tool by the teacher. For example, it is usual for the player to first go after letter pieces he knows or is familiar with. Letters that he is not familiar with, or which are difficult to him, he will leave to last. Hence the teacher can readily identify the letters of the alphabet that are a problem to the student, and based on this define a prescription for learning for the child.

The embodiments of the invention in which an exclusive property or privilege is claimed are defined as follows:

1. A game apparatus for improving the letter-name perception and discrimination capabilities of a player comprising the combination of:
    a game board having a plurality of cut-outs corresponding in configuration to the letters of the alphabet;
    a plurality of letter pieces corresponding in configuration and size to said cut-outs in said board, each letter piece being at least in part made of a magnetically metallic material;

a grid structure means including a grid spaced from a platform by a post, with the letter pieces being initially placed on said platform; and a magnetic pick-up device which is used by the player for engaging a letter-piece disposed on the platform and lifting same through the grid, after which the player inserts the letter piece in the corresponding cut-out in the game board.

2. A game apparatus as in claim 1 wherein the cut-outs in the game board are of the lower case letters of the alphabet, and wherein indicia is provided on the game board consisting of the capital letters of the alphabet, with each capital letter being disposed adjacent to its corresponding lower case cut-out, and wherein an indicia border is provided around each pair of lower and upper case letters.

3. A game apparatus as in claim 2 wherein the capital letter indicia and the cut-outs of the lower case letters are colored, with the colors of the same letters being identical.

4. A game apparatus as in claim 1 wherein the upper half portion of each letter piece is colored in a vivid color so as to distinguish the upper half of each letter piece from the lower half thereof.

5. A game apparatus as in claim 4 wherein the metallic portion of the letter piece is disposed on the lower portion of the letter piece.

6. A game apparatus as in claim 1 wherein each letter piece includes a number.

7. A game apparatus as in claim 1 wherein the openings in the grid are generally oblong.

8. A game apparatus as in claim 1 wherein the openings in the grid are triangularly shaped.

9. A game apparatus as in claim 1 wherein the openings in the grid are generally circular.

10. A game apparatus as in claim 1 wherein the upper surface of the platform of the grid structure means is painted white to increase the contrast between the platform and the letter pieces placed thereon.

11. A game apparatus as in claim 1 wherein the magnetic pick-up device is partially transparent so as to aid the player in viewing the letter pieces.

12. A game apparatus as in claim 1 wherein the openings in the grid are rectangular.

* * * * *